US012036640B2

(12) United States Patent
Park

(10) Patent No.: US 12,036,640 B2
(45) Date of Patent: Jul. 16, 2024

(54) REMOVABLE TORQUE WRENCH

(71) Applicant: BoltingMaster Co., Ltd., Suncheon-si (KR)

(72) Inventor: Keum Joon Park, Suncheon-si (KR)

(73) Assignee: BoltingMaster Co., Ltd., Suncheon-si (KR)

(*) Notice: Subject to any disclaimer, the term of this patent is extended or adjusted under 35 U.S.C. 154(b) by 791 days.

(21) Appl. No.: 17/253,511

(22) PCT Filed: Dec. 15, 2020

(86) PCT No.: PCT/KR2020/018310
§ 371 (c)(1),
(2) Date: Dec. 17, 2020

(87) PCT Pub. No.: WO2022/124459
PCT Pub. Date: Jun. 16, 2022

(65) Prior Publication Data

US 2022/0176522 A1 Jun. 9, 2022

(30) Foreign Application Priority Data

Dec. 8, 2020 (KR) ........................ 10-2020-0170033

(51) Int. Cl.
*B25B 21/00* (2006.01)
*B25B 13/06* (2006.01)
*B25B 23/00* (2006.01)

(52) U.S. Cl.
CPC .............. *B25B 21/00* (2013.01); *B25B 13/06* (2013.01); *B25B 23/0007* (2013.01)

(58) Field of Classification Search
CPC ...... B25B 21/00; B25B 13/06; B25B 23/0007
USPC .......................................................... 173/217
See application file for complete search history.

(56) References Cited

U.S. PATENT DOCUMENTS

2005/0279517 A1* 12/2005 Hoffman .................. B25F 3/00 173/29
2014/0332243 A1* 11/2014 Baskar ...................... B25F 5/02 173/29
2015/0321305 A1* 11/2015 Saur ........................ B23Q 5/045 173/29
2021/0031340 A1* 2/2021 Sebree ................ B25B 23/0021
2021/0138617 A1* 5/2021 Czirjak ..................... B25F 5/02
(Continued)

*Primary Examiner* — Anne Marie Antonucci
*Assistant Examiner* — Luis G Del Valle
(74) *Attorney, Agent, or Firm* — Bridgeway IP Law Group, PLLC; Sang Ho Lee; Hyun Woo Shin

(57) ABSTRACT

Provided is a gear box removable electrically driven torque wrench. The gear box removable electrically driven torque wrench includes: a body casing 10 including a body part 12 in which an electric motor and a motor driver are mounted in an internal accommodation space and a handle part 14 extending downward of the body part; a gear box 20 dynamically coupled to a motor rotation shaft 13 of the electric motor in front of the body part 12, and adding and reducing an output according to driving of the electric motor and transmitting the added and reduced output to a tightening member; and an adapter socket including a coupling adapter installed on a gear box coupled surface 11 in front of the body part 12 and a coupling socket fixedly installed on a body coupled surface 21 at the rear of the gear box 20 and detachably coupled to the coupling adapter.

5 Claims, 7 Drawing Sheets

(56) References Cited

U.S. PATENT DOCUMENTS

| | | | | |
|---|---|---|---|---|
| 2021/0283948 | A1* | 9/2021 | Mica | B25B 23/0007 |
| 2021/0362307 | A1* | 11/2021 | Anderson | B25F 3/00 |

* cited by examiner (a)

(b)

REMOVABLE TORQUE WRENCH

BACKGROUND

Technical Field

The present invention relates to a torque wrench, and more particularly, to a removable electrically driven torque wrench capable of replacing a gear box.

Background Art

A torque wrench is a wrench tool used to fasten a nut to a bolt according to a given torque value. The torque wrench is widely used for fastening the bolt in various industrial sites such as power plants, petrochemicals, construction, automobiles, shipbuilding, and railways. In industrial sites, a target torque value for each facility, determined by trial and error for a long time based on standard and theoretical calculations, is set as an output torque value, and the bolting work is carried out under thorough management.

Types of torque wrenches include hydraulic torque wrenches and electrically driven torque wrenches. The hydraulic torque wrench fastens the bolt with a torque corresponding to hydraulic pressure sent from hydraulic pump equipment and the electrically driven torque wrench fastens the bolt with a torque corresponding to a motor driving force generated by an electric motor.

In general, the hydraulic torque wrench is used for a bolt fastening work of large facilities or structures that require a large tightening force. On the other hand, since the electrically driven torque wrench has portability that can be carried by an operator, the electrically driven torque wrench has an advantage of being able to fasten the bolts without limiting a working space.

Further, in the hydraulic torque wrench, since a hydraulic pump and wrench equipment are connected by a hose, it is difficult to change the output torque value in real time. The reason is that even though supplied hydraulic pressure is changed, there a time delay until the output torque value is actually changed.

On the other hand, since the electrically driven torque wrench can control an operation of the electric motor in real time through an electric signal, the output torque value can be changed in real time.

In general, the electrically driven torque wrench has a body casing including: a body part in which the electric motor and a motor driver are mounted in an internal accommodation space; a handle part extending downward from the main body part; and a battery part coupled to a bottom direction of the handle part.

In addition, the electrically driven torque wrench has a gearbox that is dynamically coupled to a motor rotation shaft of the electric motor in front of the body part, and adds or reduces an output according to driving of the electric motor and transmits the added or reduced output to a tightening member.

However, the electrically driven torque wrench according to the prior art is manufactured and released in a state in which the body casing and the gear box are integrally coupled. That is, the electrically driven torque wrench of a single product is manufactured and released only in a form in which a gearbox having a specific single reduction ratio is integrally coupled.

When the reduction ratio required for the bolting work is different for each industrial site or for each facility, there is a problem that a cost burden is very large because it is necessary to purchase various types of electrically driven torque wrench products with different reduction ratios.

In addition, from a worker's point of view, there is an inconvenience of carrying several types of electrically driven torque wrench products at the same time.

SUMMARY OF THE DISCLOSURE

The present invention is to solve the above-described problem, and the present invention has been made in an effort to provide a removable electrically driven torque wrench which can commonly use a body casing of an electrically driven torque wrench and replace a gear box by a method for attaching/detaching the gear box to the body casing.

According to an embodiment of the present invention, a gear box removable electrically driven torque wrench includes: a body casing 10 including a body part 12 in which an electric motor and a motor driver are mounted in an internal accommodation space and a handle part 14 extending downward of the body part; a gear box 20 dynamically coupled to a motor rotation shaft 13 of the electric motor in front of the body part 12, and adding and reducing an output according to driving of the electric motor and transmitting the added and reduced output to a tightening member; and an adapter socket including a coupling adapter installed on a gear box coupled surface 11 in front of the body part 12 and a coupling socket fixedly installed on a body coupled surface 21 at the rear of the gear box 20 and detachably coupled to the coupling adapter.

By an electrically driven torque wrench according to an embodiment of the present invention, there is an effect that a body casing can be commonly used and a gear box can be replaced and used by a method for attaching/detaching the gear box to/from the body casing.

DETAILED DESCRIPTION

Figure 1:
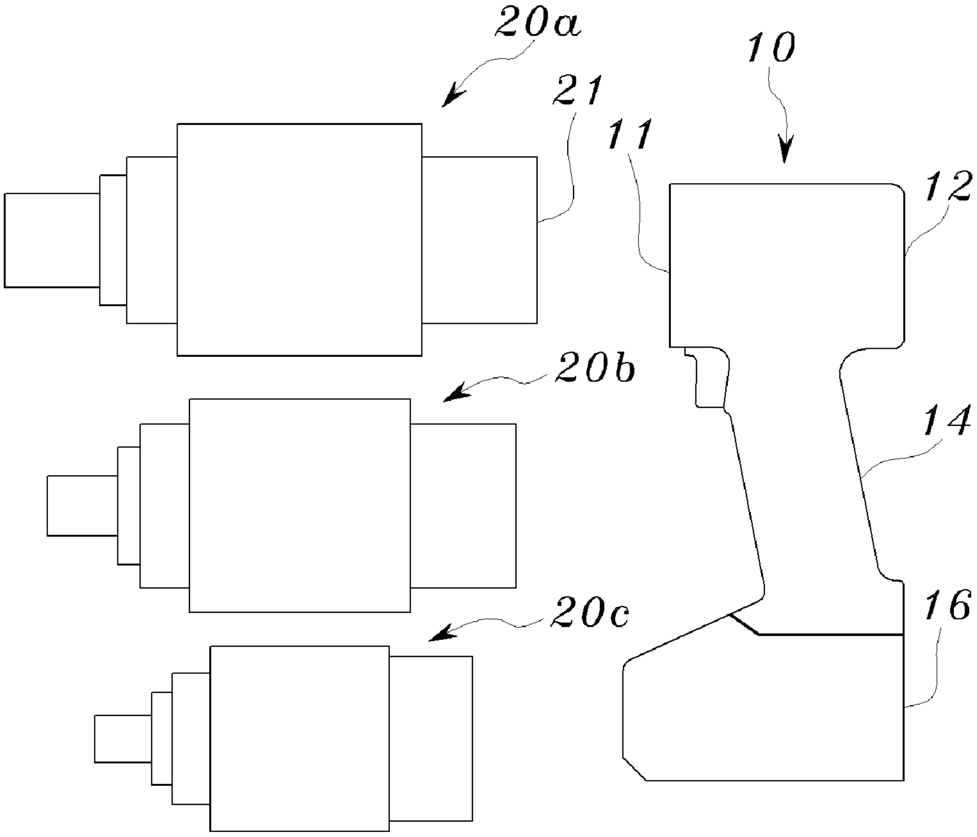
FIG. 1 is a diagram for describing a concept of a gear box removable electrically driven torque wrench according to an embodiment of the present invention.
Figure 2:
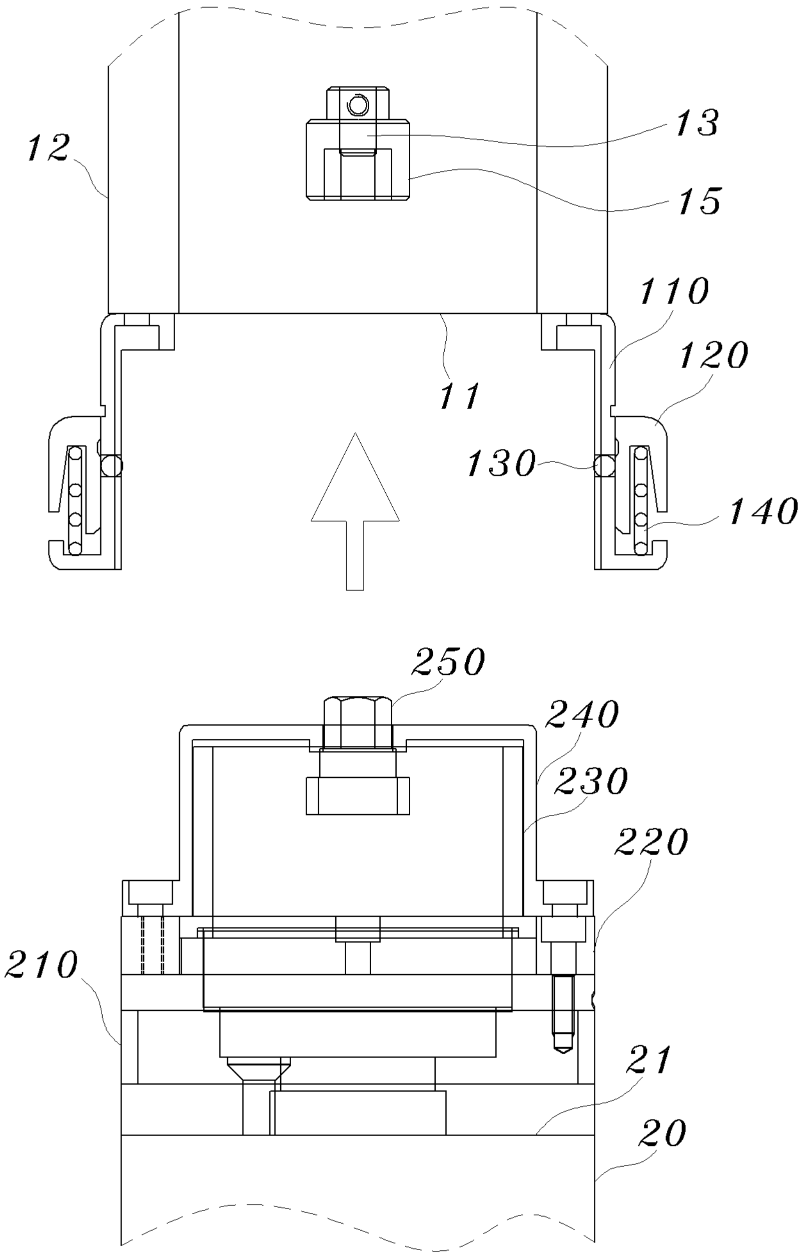
FIGS. 2 to 7 are reference diagrams for describing an adapter socket used for the gear box removable electrically driven torque wrench.
Figure 3:
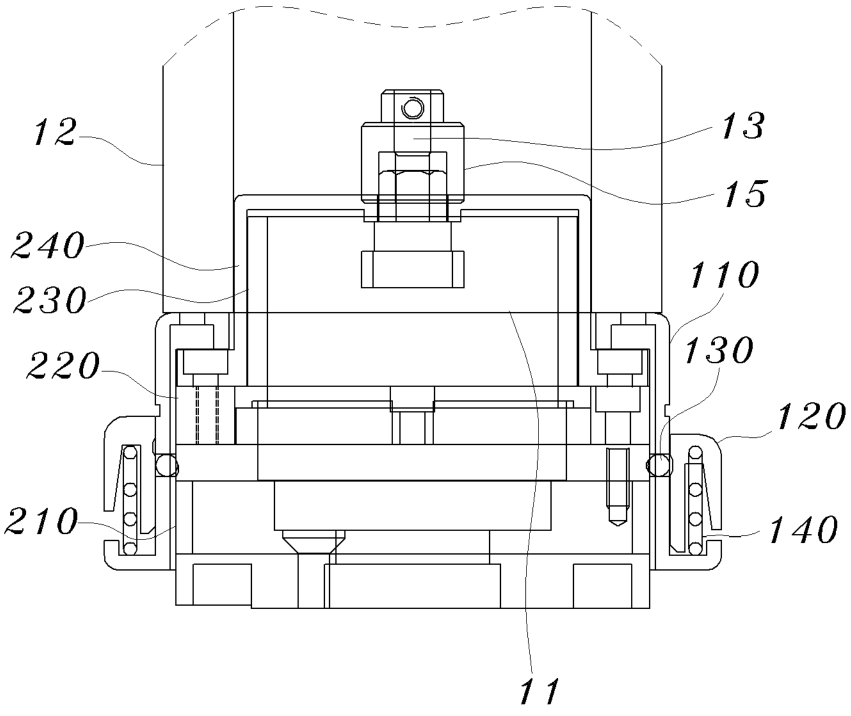
Figure 4:
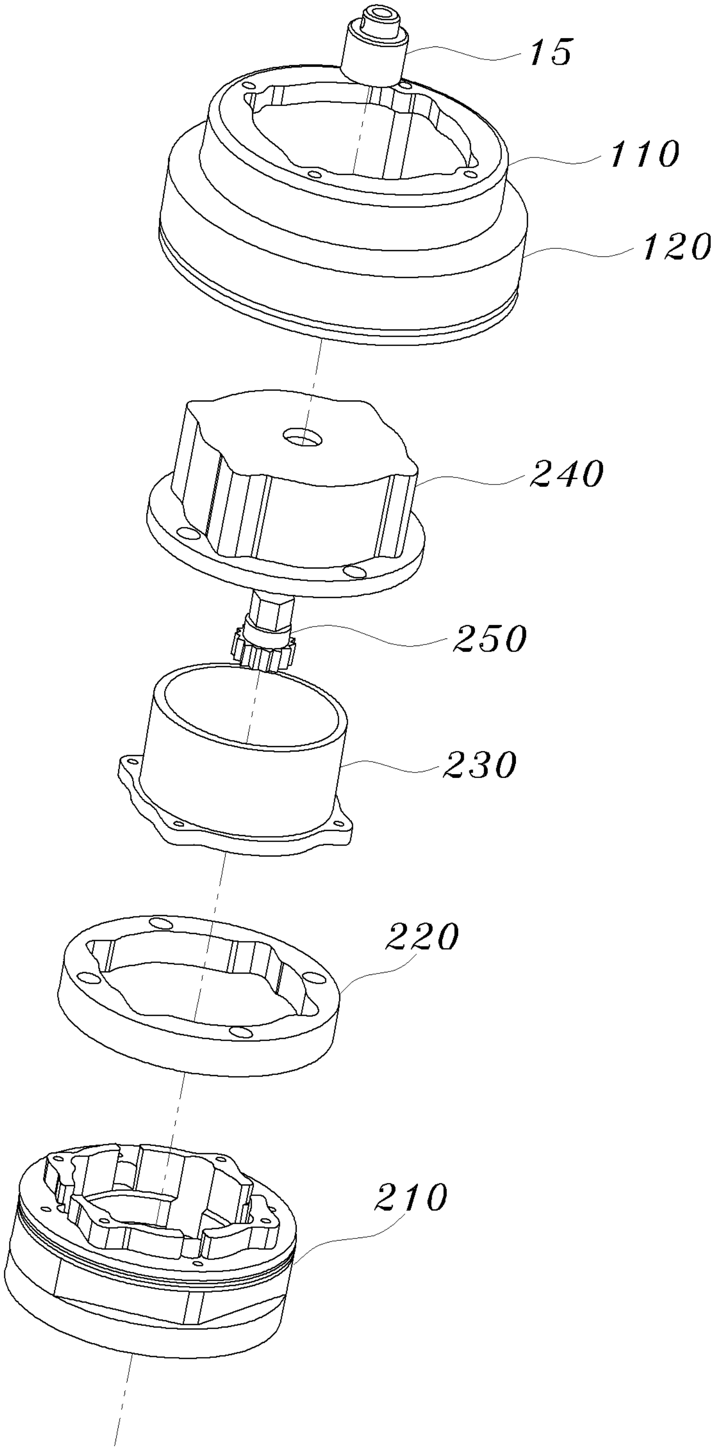

The present invention may have various modifications and various embodiments and specific embodiments will be illustrated in the drawings and described in detail in the detailed description. However, this does not limit the present invention within specific embodiments, and it should be understood that the present invention covers all the modifications, equivalents and replacements within the idea and technical scope of the present invention.

Further, throughout the specification, if it is described that one component is "connected" or "coupled" the other component, it is understood that the one component may be directly connected to or may be directly coupled to the other component but unless explicitly described to the contrary, another component may be "connected" or "coupled" between the components. In addition, unless explicitly described to the contrary, the word "comprise" and variations such as "comprises" or "comprising", will be understood to imply the inclusion of stated elements but not the exclusion of any other elements.

Hereinafter, an embodiment of the present invention will be described in detail with reference to the accompanying drawings.

FIG. 1 is a diagram for describing a concept of a gear box removable electrically driven torque wrench according to an embodiment of the present invention.

Figure 5:
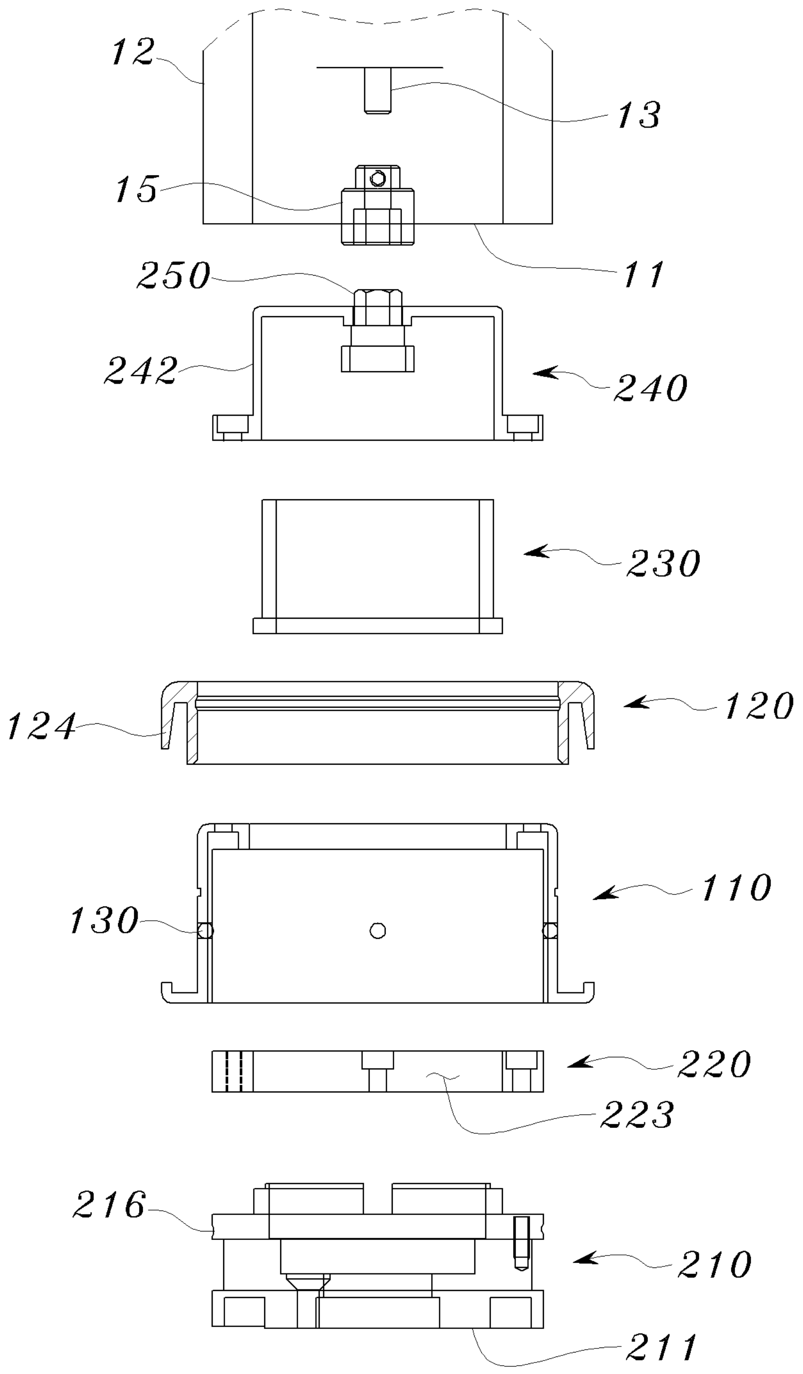
Figure 6:
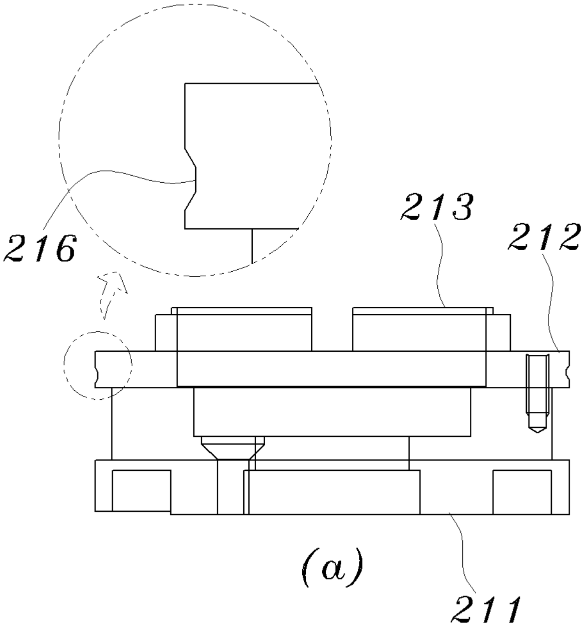
Figure 6:
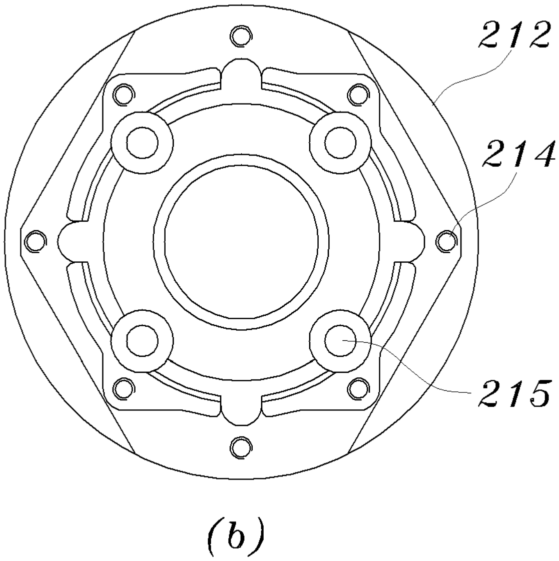
Figure 7:
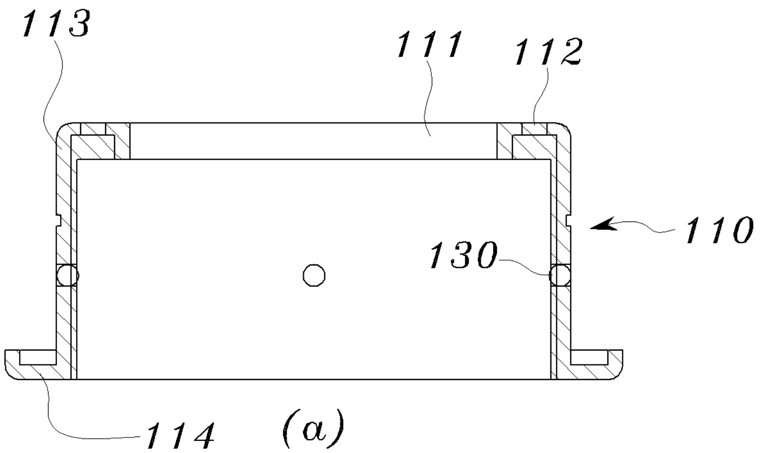
Figure 7:
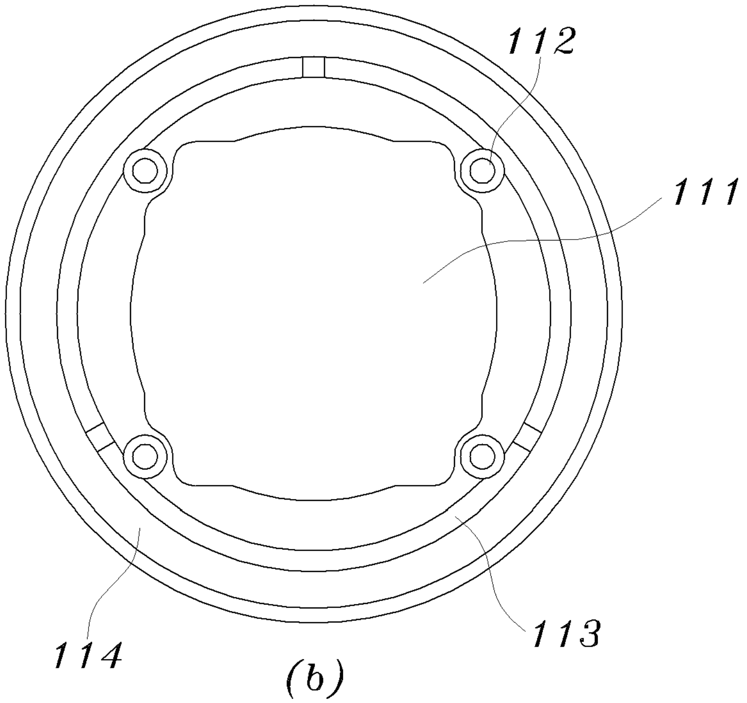

Referring to FIG. 1, a removable electrically driven torque wrench according to an embodiment of the present invention includes: a body casing 10 including a body part 12 in which an electric motor and a motor driver are mounted in an internal accommodation space, a handle part 14 extending downward of the body part, and a detachable battery part 16 coupled to a bottom direction of the handle part 14; and a gear box 20 dynamically coupled to a motor rotation shaft (reference numeral 13 of FIG. 5) of the electric motor in front of the body part 12, and adding and reducing an output according to driving of the electric motor and transmitting the added and reduced output to a tightening member.

Further, the removable electrically driven torque wrench includes an adapter socket including a coupling adapter installed on a gear box coupled surface 11 in front of the body part 12 and a coupling socket fixedly installed on a body coupled surface 21 at the rear of the gear box 20 and detachably coupled to the coupling adapter.

In the removable electrically driven torque wrench according to an embodiment of the present invention, gear boxes (see reference numerals 20*a*, 20*b*, and 20*c* of FIG. 1) having various reduction ratios may be replaced and used while a common body casing 10 is left as it is by using the adapter socket.

Hereinafter, a configuration of the adapter socket will be described in detail. Here, FIGS. 2 to 7 are reference diagrams for describing an adapter socket used for the gear box removable electrically driven torque wrench.

According to FIGS. 2 to 7, the coupling socket includes a socket base member 210 coupled face-to-face to the body coupled surface 21 of the gear box 20, a socket function member 240 installed on the socket base member 210, an intermediate mediation member 220 intermediating coupling of the socket function members 240 in the middle, and an intermediate insertion member 230 seated on the intermediate mediation member 220 and closely inserted into the internal accommodation space of the socket function member 240.

Here, the socket base member 210 includes a protrusion portion 213 extending from an upper surface 212, a plurality of fixation piece coupling holes 214 provided on the upper surface 21 around the protrusion portion 213 at an equal interval, a plurality of first through-holes provided in the protrusion portion 213 at the equal interval and penetrating up to a bottom 211, and a ball bearing seating rail 216 formed in a guide rail form inserted inside along a circumference of an outer peripheral surface of the upper surface 212.

The intermediate mediation member 220 has a second through-hole 223 which is manufactured so as to the same diameter as the diameter of the outer peripheral surface of the socket base member 210 and provided so as to closely insert the protrusion portion 213.

The socket function member 240 includes a cylindrical protrusion portion 242 in which the bottom is fixedly installed on the upper surface of the intermediate mediation member 220 and having the same outer peripheral surface diameter as the inner peripheral surface diameter of a body insertion space inserted inward from the gear box coupled surface 11 of the body part 12.

The coupling socket includes a socket coupler 250 protruding on the center of the upper surface of the cylindrical protrusion portion 242 of the socket function member 240.

In this case, as the cylindrical protrusion portion 242 is closely inserted into the body insertion space, the socket coupler 250 is physically coupled to a shaft coupler 15 mounted on a motor rotation shaft 13 of the electric motor and dynamically coupled to the motor rotation shaft 13 and a gear input shaft of the gear box 20.

Further, the coupling adapter includes a first cylindrical member 110 fixedly installed on the gear box coupled surface 11 and extending in a front longitudinal direction from the gear box coupled surface 11 so as to have an inner insertion space and a second cylindrical member 120 having a cavity having the same inner circumferential diameter as a diameter of a circumference outer peripheral surface so as to be slidably coupled onto the circumference outer peripheral surface of the first cylindrical member 110. The coupling adapter is provided as a cylindrical member covering the gear box coupled surface 11 of the body part 12 and has an inner circumferential cavity into which the coupling socket is able to be closely inserted.

The inner peripheral surface of the first cylindrical member 110 has the same diameter as the outer peripheral surface of the coupling socket and when the coupling socket is inserted and coupled into the coupling adapter, at least a portion of the socket base member 210 is inserted into the inner insertion space of the first cylindrical member 110. Further, a through-hole 111 through which the socket function member 240 may be inserted and penetrated is formed at a center portion of the upper surface 112, and a plurality of seating holes on which ball bearings 130 may be seated are provided on an outer peripheral surface side 113 of the first cylindrical member 110 at an equal interval.

A first curve portion 114 extending in the direction of the outer peripheral surface side 113 and bent toward a rear end direction is provided on a front end of the first cylindrical member 110 and a second curve portion 124 extending in the direction of the outer peripheral surface side and bent toward a front end direction is provided on a rear end of the second cylindrical member 120.

When the first cylindrical member 120 is slidably coupled to the first cylindrical member 114, an elastic body installed in a circumference space between the second curve portion 124 and the first curve portion 114 is included.

As a result, while the coupling socket is inserted and coupled into the coupling adapter and the socket coupler 250 is physically coupled to a shaft coupler 15 mounted on the motor rotation shaft 13 of the electric motor, when the second curve portion 124 of the second cylindrical member 120 is slid in a direction to approach the first curve portion 114 of the first cylindrical member 110, the ball bearing 130 installed on the outer peripheral surface side 113 of the first cylindrical member 110 is seated on a ball bearing seating rail 216 of the socket base member 210 to fixedly couple the coupling socket and the coupling adapter.

Contrary to this, when the second curve portion 124 of the second cylindrical member 120 is slid in a direction to be away from the first curve portion 114 of the first cylindrical member 110, the coupling is released, and as a result, the gear box may be replaced.

The present invention has been described with reference to the embodiments. However, it will be able to be easily appreciated by those skilled in the art that various modifications and changes of the present disclosure can be made without departing from the spirit and the scope of the present disclosure which are defined in the appended claims and their equivalents.

What is claimed is:

1. A gear box removable electrically driven torque wrench comprising:
- a body casing including a body part and a handle part extending downward of the body part;
- a gear box dynamically coupled to a motor rotation shaft front of the body part; and
- an adapter socket including a coupling adapter installed on a gear box coupled surface in front of the body part and a coupling socket fixedly installed on a body coupled surface at the rear of the gear box and detachably coupled to the coupling adapter,
- wherein the coupling adapter is provided as a cylindrical member covering the gear box coupled surface of the body part and has an inner circumferential cavity into which the coupling socket is able to be closely inserted,
- wherein the coupling socket includes a socket base member coupled face-to-face to the body coupled surface of the gear box, a socket function member installed on the socket base member, an intermediate mediation member intermediating coupling of the socket function members in the middle, and an intermediate insertion member seated on the intermediate mediation member and closely inserted into an internal accommodation space of the socket function member, and
- the coupling adapter includes a first cylindrical member fixedly installed on the gear box coupled surface and extending in a front longitudinal direction from the gear box coupled surface so as to have an inner insertion space and a second cylindrical member having a cavity having the same inner circumferential diameter as a diameter of a circumference outer peripheral surface so as to be slidably coupled onto the circumference outer peripheral surface of the first cylindrical member,
- wherein the socket base member includes a protrusion portion extending from an upper surface, a plurality of fixation piece coupling holes provided on the upper surface around the protrusion portion at an equal interval, a plurality of first through-holes provided in the protrusion portion at the equal interval and penetrating up to a bottom, and a ball bearing seating rail formed in a guide rail form inserted inside along a circumference of an outer peripheral surface of the upper surface,
- the intermediate mediation member has a second through-hole which is manufactured so as to the same diameter as the diameter of the outer peripheral surface of the socket base member and provided so as to closely insert the protrusion portion, and
- the socket function member includes a cylindrical protrusion portion in which the bottom is fixedly installed on the upper surface of the intermediate mediation member and having the same outer peripheral surface diameter as the inner peripheral surface diameter of a body insertion space inserted inward from the gear box coupled surface of the body part.

2. The gear box removable electrically driven torque wrench of claim 1, wherein the coupling socket includes a socket coupler protruding on the center of the upper surface of the cylindrical protrusion portion of the socket function member, and
- wherein as the cylindrical protrusion portion is closely inserted into the body insertion space, the socket coupler is physically coupled to a shaft coupler mounted on a motor rotation shaft and dynamically coupled to the motor rotation shaft and a gear input shaft of the gear box.

3. The gear box removable electrically driven torque wrench of claim 2, wherein the inner peripheral surface of the first cylindrical member has the same diameter as the outer peripheral surface of the coupling socket and when the coupling socket is inserted and coupled into the coupling adapter, at least a portion of the socket base member is inserted into the inner insertion space of the first cylindrical member,
- a through-hole through which the socket function member may be inserted and penetrated is formed at a center portion of the upper surface, and
- a plurality of seating holes on which ball bearings may be seated are provided on an outer peripheral surface side of the first cylindrical member at an equal interval.

4. The gear box removable electrically driven torque wrench of claim 3, wherein a first curve portion extending in the direction of the outer peripheral surface side and bent toward a rear end direction is provided on a front end of the first cylindrical member,
- a second curve portion extending in the direction of the outer peripheral surface side and bent toward a front end direction is provided on a rear end of the second cylindrical member, and
- when the first cylindrical member is slidably coupled to the first cylindrical member, an elastic body installed in a circumference space between the second curve portion and the first curve portion is included.

5. The gear box removable electrically driven torque wrench of claim 4, wherein while the coupling socket is inserted and coupled into the coupling adapter and the socket coupler is physically coupled to a shaft coupler mounted on the motor rotation shaft,
- when the second curve portion of the second cylindrical member is slid in a direction to approach the first curve portion of the first cylindrical member,
- the ball bearing installed on the outer peripheral surface side of the first cylindrical member is seated on the ball bearing seating rail of the socket base member to fixedly couple the coupling socket and the coupling adapter.

* * * * *